(12) United States Patent
Oliver

(10) Patent No.: US 12,188,783 B2
(45) Date of Patent: Jan. 7, 2025

(54) TILT DETECTION AND ALARM SYSTEM AND METHOD

(71) Applicant: William R. Oliver, Junction, TX (US)

(72) Inventor: William R. Oliver, Junction, TX (US)

( * ) Notice: Subject to any disclaimer, the term of this patent is extended or adjusted under 35 U.S.C. 154(b) by 272 days.

(21) Appl. No.: 17/715,368

(22) Filed: Apr. 7, 2022

(65) Prior Publication Data

US 2023/0324172 A1 Oct. 12, 2023

(51) Int. Cl.
*G01C 9/06* (2006.01)
*G08B 21/18* (2006.01)

(52) U.S. Cl.
CPC .............. *G01C 9/06* (2013.01); *G08B 21/18* (2013.01)

(58) Field of Classification Search
CPC .................................. G01C 9/06; G08B 21/18
See application file for complete search history.

(56) References Cited

U.S. PATENT DOCUMENTS

| | | | |
|---|---|---|---|
| 4,555,697 A | 11/1985 | Thackrey | |
| 4,812,824 A * | 3/1989 | Holt | G08B 13/02 200/61.93 |
| 4,876,532 A * | 10/1989 | Sauls | G07F 9/026 340/636.15 |
| 5,241,297 A * | 8/1993 | Goodman | G08B 13/1472 200/341 |
| 5,349,329 A * | 9/1994 | Smith | B60R 25/04 340/522 |
| 5,434,559 A * | 7/1995 | Smiley | G08B 13/1436 340/689 |
| 5,614,886 A * | 3/1997 | Snell | G08B 21/0247 340/568.1 |
| 6,133,842 A * | 10/2000 | Gariepy | G08B 13/149 340/689 |
| 6,392,556 B2 * | 5/2002 | Tomich | A47D 1/00 340/689 |
| 6,858,835 B2 * | 2/2005 | Smith | H05B 47/10 250/221 |
| 7,506,468 B2 | 3/2009 | Farrell | |
| 7,944,369 B2 * | 5/2011 | Appleyard | G08B 13/1436 340/689 |
| 10,577,041 B2 * | 3/2020 | Pankratius | B62H 5/20 |
| 2010/0117831 A1 * | 5/2010 | Katabira | G08B 13/1436 340/568.3 |

FOREIGN PATENT DOCUMENTS

JP 3896703 B2 * 3/2007

* cited by examiner

*Primary Examiner* — Jamel E Williams
(74) *Attorney, Agent, or Firm* — The Langley Law Firm, P.C.

(57) ABSTRACT

A system includes an alarm, a tilt detector, and a power supply communicatively connected to the tilt detector and communicatively connected to the alarm. The tilt detector, when no tilt is detected, prohibits communicative connection of the power supply to the alarm and, when tilt is detected, effects communicative connection of the power supply to the alarm. The system does not consume power of the power supply unless and until the system tilts causing the tilt switch to communicatively connect the power supply to the alarm. The alarm sounds on tilt until such time as the system is reset.

4 Claims, 4 Drawing Sheets

TILT DETECTION AND ALARM SYSTEM AND METHOD

TECHNICAL FIELD

The invention generally relates to alarms, and more particularly relates to tilt detection and alarm devices and operations.

BACKGROUND

Serious injury can occur if upright furniture, vending machine, or similar standing systems tilt and fall. Tilt can happen because someone shakes or pushes the systems causing tilt. Once tilted, the systems may fall upon a person or property causing harm.

As specific non-exclusive example, a toddler, other person, pet or other may push, pull or nudge an upstanding furniture (dresser, bookcase, chest of drawers, etc.), equipment (ironing board, tv, etc.), or similar feature. If the feature then tilts and falls, injury to the person or property can occur.

It would be a significant improvement in the art and technology to provide systems and methods for detecting tilt of upstanding features, such as chests, armoires, vending machines, and other structures. It would also be an improvement to provide an alarm that sounds upon a tilt of structure. It would further be an improvement to limit energy consumption in a tilt and alarm system and method to provide for long battery life or other conservation of power.

SUMMARY

An embodiment of the invention is a system that includes an alarm, a tilt detector; and a power supply communicatively connected to the tilt detector and communicatively connectable to the alarm. The tilt detector, when no tilt is detected, prohibits communicative connection of the power supply to the alarm. The tilt detector, when tilt is detected, effects communicative connection of the power supply to the alarm.

Another embodiment of the invention is a method that includes detecting a tilt by a tilt detector, latching a circuit connected to an alarm, and sounding the alarm upon detecting.

Yet another embodiment of the invention is a method of manufacture including providing an alarm, communicatively connecting a tilt switch to the alarm, and communicatively connecting a power supply to the tilt switch and the alarm.

BRIEF DESCRIPTION OF THE DRAWINGS

The present invention is illustrated by way of example and not limitation in the accompanying figures, in which like references indicate similar elements, and in which.

DETAILED DESCRIPTION

Figure 1:
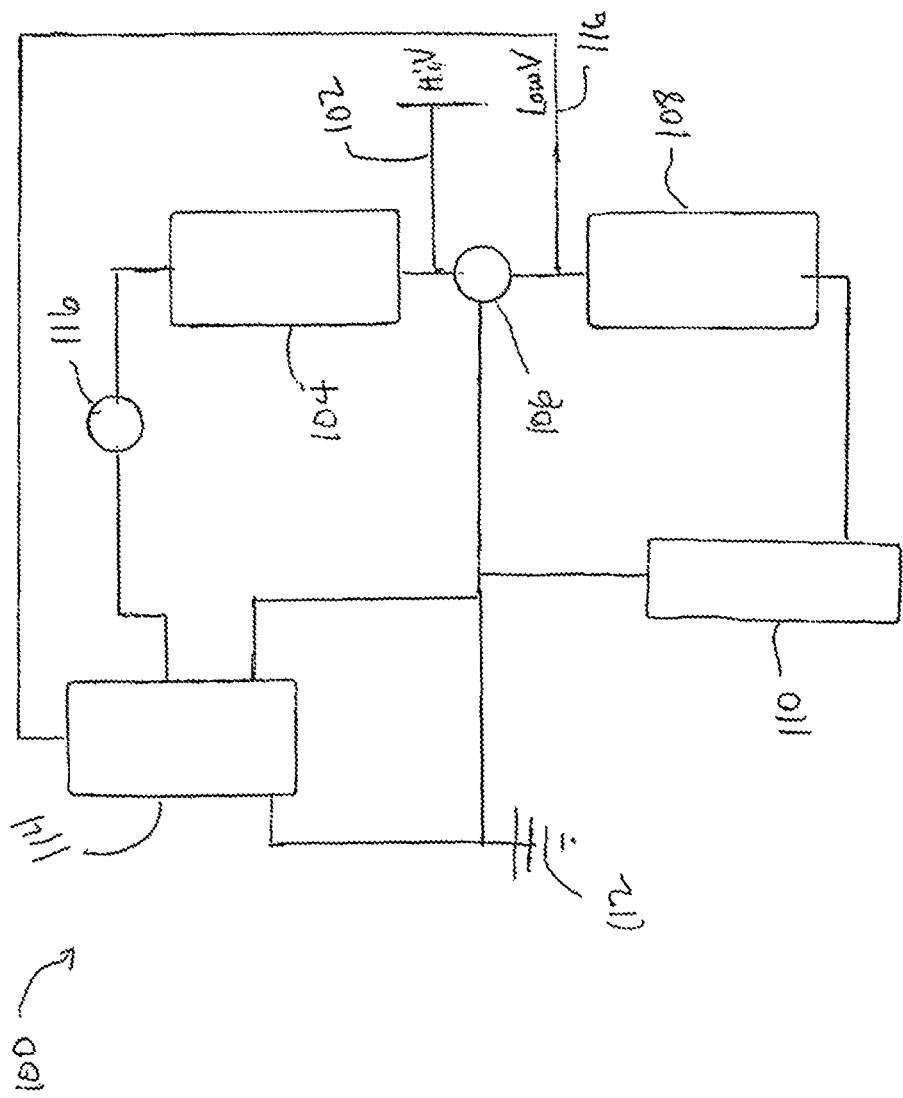
FIG. 1 illustrates a tilt alarm circuit, according to certain embodiments of the invention.

Referring to FIG. 1, a system 100 includes a power source 102 communicatively connected to an alarm 104. The power source 102 is also communicatively connected to a switch 106. The alarm 104 is communicatively connected to an amplifier 116.

A latch 114 is communicatively connected to the switch 102. The latch 114 is also communicatively connected to the amplifier 116. A diode 108 is communicatively connected to the switch 106 and provides a second power source 116 which is lower than the power source 102. The second power source 116 may be provided by the diode 108 from the power source 102.

A tilt switch 110 is communicatively connected to the switch 106 and the diode 108. The tilt switch 110 is "on" to complete the circuits when the switch 110 is tilted or repositioned.

In operation, the tilt switch 110 is "off" causing grounding of the circuitry of the system 100 so long as the tilt switch 110 is not tilted or, as the case may be, otherwise moved. No power is output by the power source 102 (and consequently, or not, the second power source 116). Thus, no power is consumed.

When the tilt switch 110 is tilted or otherwise repositioned, as applicable, the tilt switch 110 is triggered "on" causing completion of the circuitry of the system 100. Power of the power source 102 flows to the diode 108. Output of the diode 108 may be a lower voltage source of the second power source 116. The second power source 116 powers the latch 114.

The latch 114 is in set mode when powered up and is in reset mode otherwise. Output of the latch 114 includes power to the amplifier 116. The amplifier 116 drives the alarm 104.

The system 100 may be housed in an enclosure (not shown in FIG. 1). The system 100 in use, as nonexclusive example, is placed atop a furniture, equipment, or other feature that is capable of tilting movement. When the feature is tilted, the system 100 sounds the alarm 104.

Figure 2:
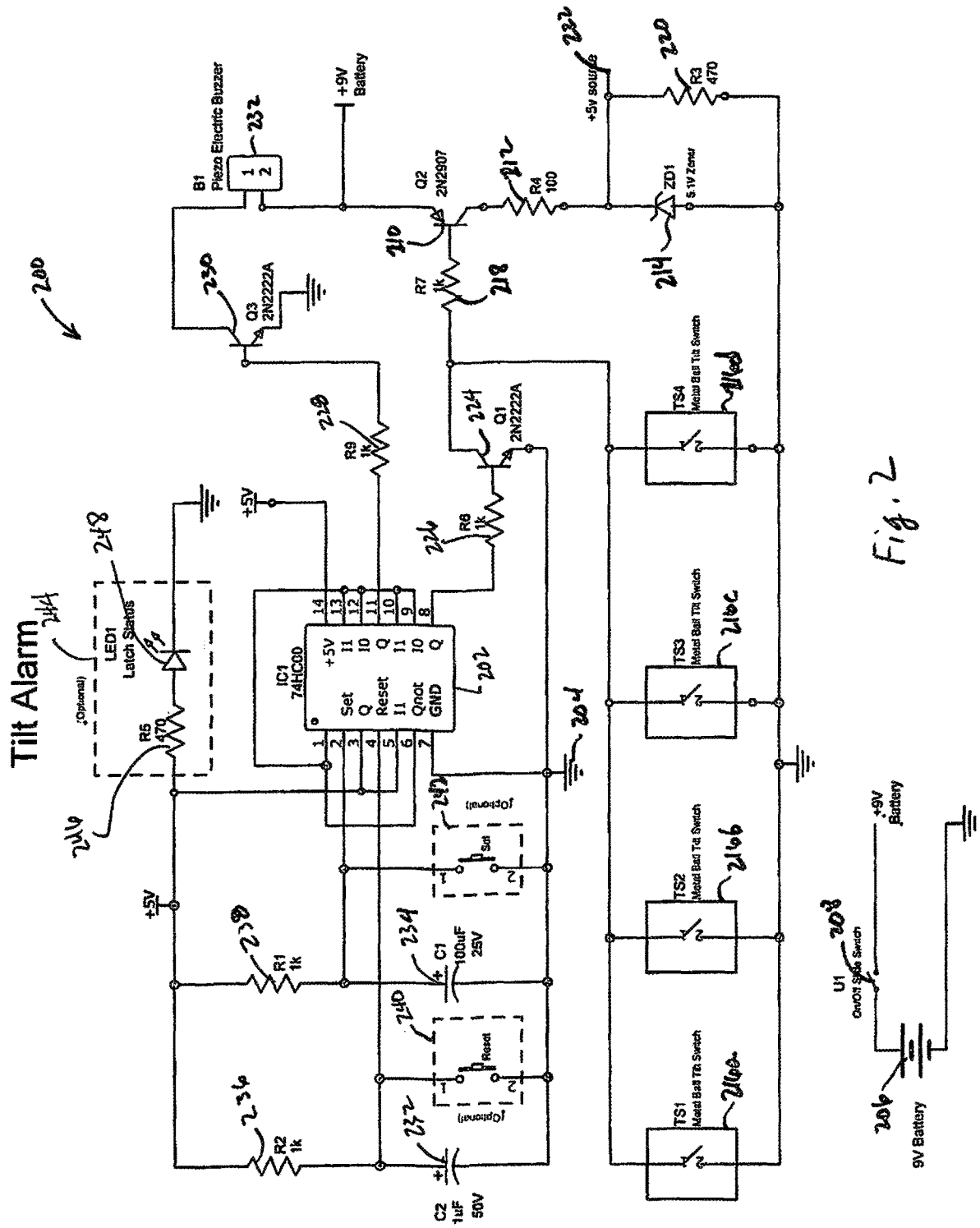
FIG. 2 illustrates a tilt alarm circuit which does not consume power unless or until tilt is detected, according to certain embodiments of the invention.

Referring to FIG. 2, a nonexclusive embodiment of a system 200 includes a circuit 202, for non-exclusive example, an integrated circuit, microcontroller, processor or other circuitry. The circuit 202 communicatively connects to ground 204. A voltage source 206, such as for non-exclusive example a 9V battery or other power source, is communicatively connected to a switch 208, such as for non-exclusive example a manually operable On/Off switch for the system 200, and ground 204.

The power supply 206 communicatively connects to a transistor 210, such as for non-exclusive example a PnP transistor. The transistor 210 is also communicatively connected to a resistor 212, for non-exclusive example a 100Ω resistor, communicatively connected to a diode 214, such as for nonexclusive example a 5.1V Zener diode. A base of the transistor 210 is communicatively connected to a resistor 218, such as for nonexclusive example a 1 kΩ resistor, across which is communicatively connected one or more tilt switch 216a-d, for nonexclusive example four metal ball tilt switches. The current across resistor 218 pulls the base of the transistor 210 to ground when any of the one or more tilt switch 216a, b, c or d is tilted to cause close (i.e., "on") of the switch 216.

A resistor 220, such as for non-exclusive example a 470Ω resistor, is connected to the diode 214 to quickly bleed off a power supply 222, such as for nonexclusive example, a +5V DC power supply, that might otherwise cause the alarm to restart when power is turned off and then back on. Current from the resistor 212 causes the diode 214 to emit signal across the resistor 220. The power output from the resistor 220 is lowered to reduced power supply 222. This reduced power supply 222 powers the circuit 202.

A capacitor 234, such as for nonexclusive example a 100 µF 25V capacitor, communicatively connects to the circuit 202 and ground 204 to a "Set" lead of the circuit 202. A capacitor 232, such as for nonexclusive example a 1 µF 50V capacitor, is communicatively connected to the circuit 202 and ground 204 as a "Reset" lead of the circuit 202.

The capacitor 234 is communicatively connected to a resistor 238, for nonexclusive example a 1 kΩ resistor. The capacitor 232 is communicatively connected to a resistor 236, for nonexclusive example a 1 kΩ resistor. The resistors 238, 236 are "pull up" resistors for the "Set" and "Reset" inputs to the circuit 202. The diode 214 is communicatively connected to the circuit 202 for the reduced power supply 222 from the diode 214.

In operation, no current is drawn from the power source 206 when the on/off switch 208 is "on" and there is not any power available to the circuit 202, unless and until tilt of any of the one or more tilt switch 216a, b, c or d. On tilt of any tilt switch 216a, b, c or d, the tilt switch turns "on" and across resistor 218 the base of the transistor 210 is pulled to ground 204. The transistor 210 is turned on and current is supplied across the resistor 212.

The circuit 202 may operate, at least in part, as an SR (Set/Reset) latch, such as for nonexclusive example, a 74HC00 quad nand-gate or other. For example, when Q of the SR latch is high and applied across a resistor 226, such as for nonexclusive example a 1 kΩ resistor, at base of a transistor 224, for nonexclusive example an NpN transistor, the emitter goes to ground 204 completing the path across the diode 214.

With Q high, the circuit 202 is communicatively connected to a resistor 228, such as for nonexclusive example a 1 kΩ resistor. The resistor 228 is communicatively connected at base of a transistor 230, for nonexclusive example an NpN transistor. With Q high, the emitter goes to ground 204 completing the path from the voltage source 206 across an alarm 232, such as for nonexclusive example a piezo electric buzzer or other, communicatively connected to the collector of the transistor 230. The alarm 232 sounds when any of the tilt switches 216a, b, c or d is tilted to close turning "on."

Continuing to refer to FIG. 2, the system 200 may, in certain alternatives, additionally include any of a set switch 242, a reset switch 240, and a status signaler 244. The set switch 242 may be communicatively connected in parallel with the capacitor 234, to ground 204 and the circuit 202. The reset switch 240 may be communicatively connected in parallel with the capacitor 232, to ground 204 and the circuit 202. The status signaler 244 may be communicatively connected to the circuit 202 and ground 204.

A resistor 246, such as for nonexclusive example a 470Ω resistor, is communicatively connected to the reduced power supply 222 and the circuit 202. The resistor 246 is also connected to an output device 248, such as for nonexclusive example an LED. The status signaler 244 is formed of the resistor 246 and the output device 248, and indicates latch status of the circuit 202 and consequently status of the system 200.

In operation of the system 200, in the alternatives, the set switch 242 may be manually or otherwise activated to cause the circuit 202 to be in a "set" position, such as for normal detection and alarm operation by the system 200. The "set" switch is only operational in the initial stages of board construction when an external +5V source is supplied for debugging purposes. The reset switch 240 may be manually or otherwise activated to cause the circuit 202 to be "reset", such as in the event of a fault or testing of the system 200. The set switch 242 and the reset switch 240 may be unitized or not, such that a switch unit may operate both for "set" and "reset", as applicable. The output device 248 of the status signaler 244 may illuminate or otherwise provide an observable signal indicative of state of the circuit 202 and system 200, either as "set" or otherwise as applicable in the particular embodiment.

Figure 3:
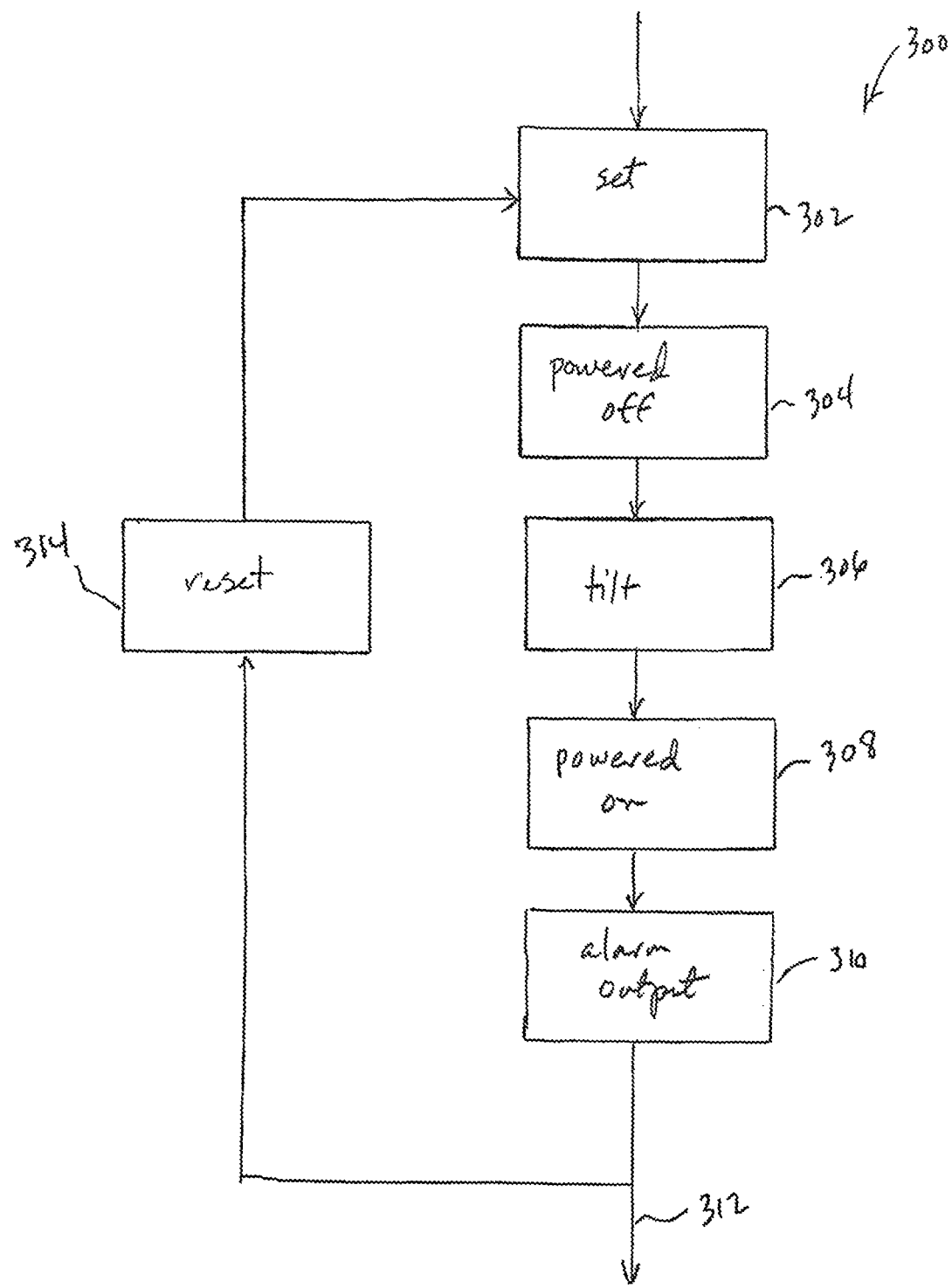
FIG. 3 illustrates a method of a tilt alarm, according to certain embodiments of the invention.

Referring to FIG. 3, a method 300 of a device detects tilt and outputs an alarm on detection. The method commences with set 302 of a circuit of the device. The device is powered off 304 when set 302. Only if and when a tilt 306 of the device occurs, the circuit of the device is powered on 308.

Upon power on 308 of the circuit of the device, the device outputs 310 an alarm. The alarm may be an audible, visual or other output as applicable in the embodiment. The alarm output 310 continues unless and until a reset 314 of the device is initiated, such as by manual or other action. On reset 314, the method 300 returns to set 302.

Figure 4:
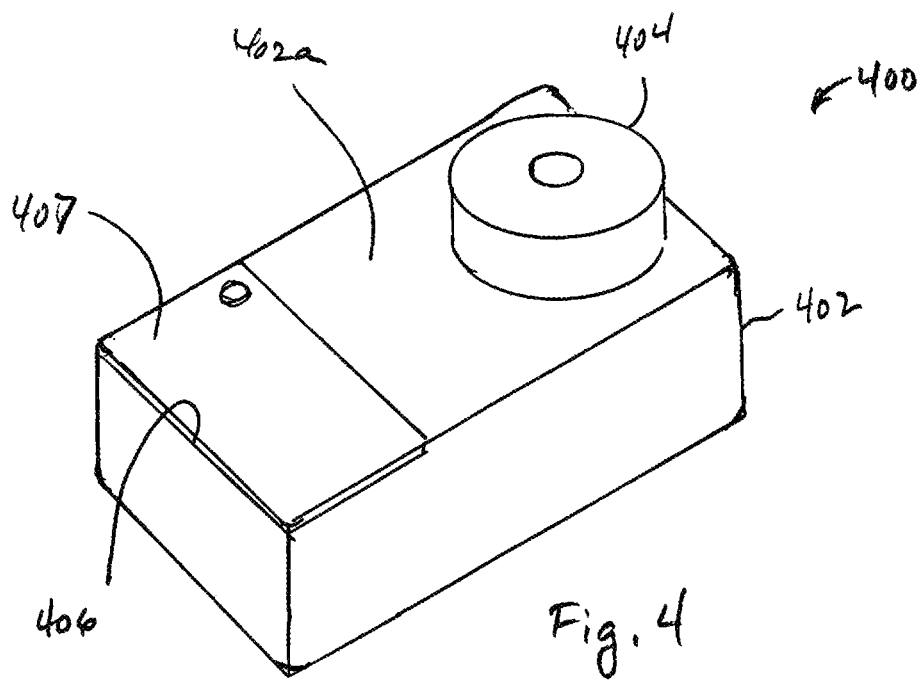
FIG. 4 illustrates a front and top perspective view of a tilt alarm enclosed in a housing, according to certain embodiments of the invention.
Figure 5:
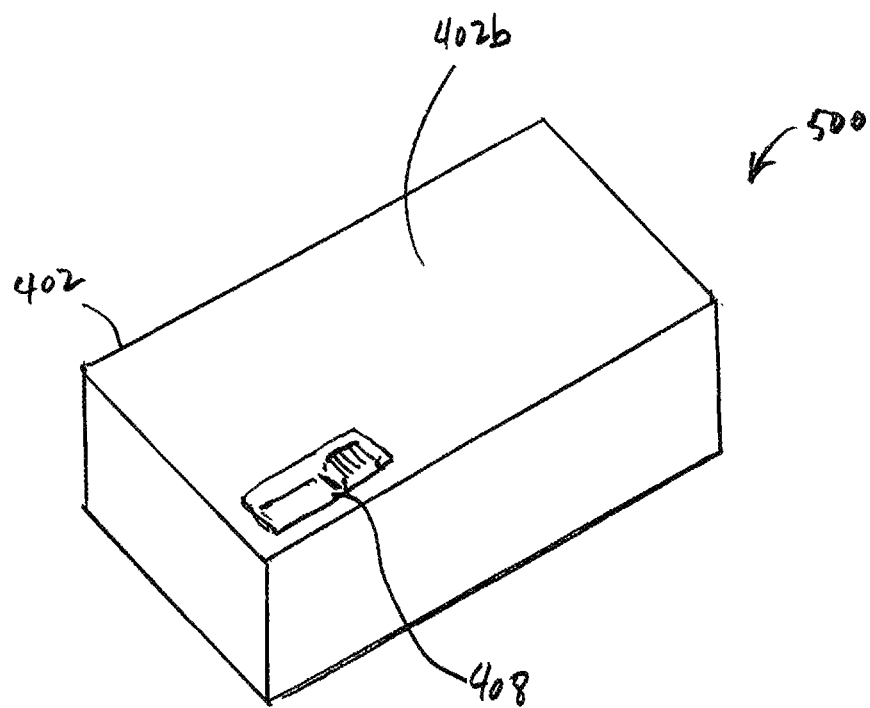
FIG. 5 illustrates a front and bottom perspective view of a tilt alarm enclosed in a housing, according to certain embodiments of the invention.

Referring to FIGS. 4 and 5, in conjunction, a device 400, 500 includes a housing 402. The housing 402 contains a circuit, such as for nonexclusive example, a circuit in accordance with the foregoing embodiments. An on/off switch 408 is contained by the housing 402, such as on a bottom 402a of the housing 402. The on/off switch 408 provides a manually operated or other feature to enable or disable the device 400.

The housing 402 connects to or contains an alarm 404. The alarm 404, for example, is a speaker or similar device that produces an audio signal or, alternately, some other cognizable signal, as applicable, on tilt of the device 400. The housing 402 also includes or communicatively connects to a battery compartment 406. A battery or other power supply In operation, the device 400 is placed on the bottom 402b atop a furniture, equipment or other feature that could tilt. The on/off switch 408 is enabled to set the circuit of the device 400 in state of readiness to detect tilt but without any application of power.

So long as the device 400 remains stationary and not tilted, an alarm of the device 400 is not triggered and no power is consumed. Upon a tilt of the device 400, however, a circuit of the device is completed and power is consumed. The power triggers the alarm. The alarm continues to output signal, such as for nonexclusive example, a buzzer or other, until the device 400 is turned off by the switch 408.

The foregoing systems and devices are manufacturable of a wide variety of materials. For nonexclusive example, semiconductors, circuit board, and/or other communicatively connected elements, in whole and/or part, comprise the operational features of the tilt alarm. The housing, and/or associated button, switch and other features, may be or include any of a wide range of relatively rigid materials such as plastic or composite, although other materials may comprise all or parts and combinations are also possible. The alarm element of the circuits of devices may be or include LED, buzzer, ringer, visual display, and/or other or combinations. Moreover, the housing, as well as all contents, may be of varied shape and size and, consequently, elements and features of the devices may be varied in shape and configuration. A wide variety of connection devices may be employed for retaining or joining the relevant elements and features. In manufacture, the structures of the devices may be molded, machined, stamped, cut, welded, printed, foundered and otherwise configured. All other possibilities, now or hereafter known or available, are included.

In the foregoing, the invention has been described with reference to specific embodiments. One of ordinary skill in the art will appreciate, however, that various modifications, substitutions, deletions, and additions can be made without departing from the scope of the invention. Accordingly, the specification and figures are to be regarded in an illustrative rather than a restrictive sense, and all such modifications substitutions, deletions, and additions are intended to be included within the scope of the invention. Any benefits, advantages, or solutions to problems that may have been described above with regard to specific embodiments, as well as device(s), connection(s), step(s) and element(s) that may cause any benefit, advantage, or solution to occur or become more pronounced, are not to be construed as a critical, required, or essential feature or element.

What is claimed is:

1. A system, comprising:
    an alarm;
    a tilt detector;
    a power supply communicatively connected to the tilt detector and communicatively connectable to the alarm;
    wherein the tilt detector, when no tilt is detected, prohibits communicative connection of the power supply to the alarm;
    wherein the tilt detector, when tilt is detected, effects communicative connection of the power supply to the alarm;
    a latch communicatively connected to the alarm;
    an event switch;
    wherein the latch, on tilt being detected by the tilt detector, maintains communicative connection of the power supply to the alarm unless and until the event switch is manipulated;
    a transistor communicatively connected to the power supply; and
    a diode communicatively connected to the transistor and the latch;
    wherein the latch is a quad nand gate and the latch is effectively communicatively connected to the power supply and the alarm when the transistor is pulled to flow current.

2. The system of claim 1, wherein the power supply is a 9V battery and the diode reduces voltage of the 9V battery to +5V communicatively connected to the latch.

3. A method of manufacture, comprising:
    providing an alarm;
    communicatively connecting a tilt switch to the alarm; and
    communicatively connecting a power supply to the tilt switch and the alarm;
    communicatively connecting a latch to the alarm and the power supply;
    communicatively connecting a reset switch to the latch;
    communicatively connecting a transistor switch to the power supply; and
    communicatively connecting a diode to the transistor and the latch.

4. The method of manufacture of claim 3, further comprising:
    enclosing the latch, the reset switch, the transistor and the diode in the housing.

* * * * *